(12) United States Patent
Eugene et al.

(10) Patent No.: US 8,692,433 B2
(45) Date of Patent: Apr. 8, 2014

(54) ROTOR OR A STATOR FOR A SUPERCONDUCTING ELECTRICAL MACHINE

(75) Inventors: Joseph Eugene, Rugby (GB); Graham Derek Le Flem, Rugby (GB)

(73) Assignee: GE Energy Power Conversion Technology Limited, Rugby, Warwickshire (GB)

( * ) Notice: Subject to any disclaimer, the term of this patent is extended or adjusted under 35 U.S.C. 154(b) by 646 days.

(21) Appl. No.: 12/288,669

(22) Filed: Oct. 22, 2008

(65) Prior Publication Data

US 2010/0096942 A1     Apr. 22, 2010

(30) Foreign Application Priority Data

Oct. 25, 2007     (GB) .................................. 0721050.3

(51) Int. Cl.
*H02K 55/04*     (2006.01)
(52) U.S. Cl.
USPC ............ 310/194; 310/52; 310/91; 310/261.1; 505/166
(58) Field of Classification Search
USPC ........... 310/179, 91, 52, 261, 194, 1; 505/166
See application file for complete search history.

(56) References Cited

U.S. PATENT DOCUMENTS

| | | | |
|---|---|---|---|
| 4,237,392 A | 12/1980 | Ying et al. | |
| 5,880,547 A * | 3/1999 | Shoykhet | ............... 310/91 |
| 6,700,274 B2 * | 3/2004 | Gamble et al. | ............... 310/179 |
| 7,592,721 B2 * | 9/2009 | Winn | ............... 310/52 |
| 2004/0090139 A1 * | 5/2004 | Wang | ............... 310/261 |

FOREIGN PATENT DOCUMENTS

| | | |
|---|---|---|
| EP | 1 261 114 A1 | 11/2002 |
| EP | 1 420 508 A2 | 5/2004 |
| JP | 55-056466 | 4/1980 |
| JP | 63-110954 | 5/1988 |
| JP | 63110954 A * | 5/1988 |

OTHER PUBLICATIONS

JP 63110954 A translation, Jan. 13, 2012.*
SU 1516587 A1, Oct. 1989, Derwent, Abdullaev et a.*

* cited by examiner

*Primary Examiner* — Tran Nguyen
*Assistant Examiner* — Leda Pham
(74) *Attorney, Agent, or Firm* — Parks IP Law LLC; Theodore A. Wood

(57) ABSTRACT

A rotor (or a stator) for a superconducting electrical machine includes a mounting that is maintained at substantially ambient temperature during operation of the electrical machine and a field coil support structure. A plurality of superconducting field coils are maintained at cryogenic temperatures during operation of the electrical machine and are supported by the field coil support structure. At least one coupling element is used to fix the field coil support structure to the mounting. The field coil support structure is preferably fixed to the mounting by a plurality of substantially circumferentially extending coupling elements at a first and second axial end of the field coil support structure and the mounting such that the mounting and field coil support structure are substantially separated over their axial lengths by a vacuum gap.

23 Claims, 4 Drawing Sheets

ROTOR OR A STATOR FOR A SUPERCONDUCTING ELECTRICAL MACHINE

FIELD OF THE INVENTION

The present invention relates to superconducting rotating electrical machines. In particular, the present invention provides a rotor or a stator that is suitable for high temperature superconducting electrical machines. The rotor or stator has high strength and low thermal conduction between the superconducting field coils and the mounting for the field coil support structure.

BACKGROUND OF THE INVENTION

Electrical machines typically comprise a cylindrical rotor mounted to rotate around or within a cooperating stator. That is, an electrical machine may have an internal substantially cylindrical rotor mounted within an external stator or an outer cylindrical rotor mounted around an internal stator. In superconducting electrical machines the stator and/or the rotor may include a plurality of superconducting field coils mounted on a field coil support structure, thereby forming a surface that is substantially adjacent to, but spaced apart from, a surface of the other of the stator or rotor.

There are several problems that must be overcome in the construction of such rotors and stators. First of all, the superconducting field coils and the field coil support structure must be kept at cryogenic temperatures when operating. In contrast, it is preferable that the mounting upon which the field coil support structure is mounted is kept as close to ambient temperature as possible in order to allow the rotor or stator to couple to other equipment or components which operate at ambient temperature. Therefore, there is the need for an improved rotor and stator construction that provides a very good thermal barrier between the field coil support structure and the mounting for the field coil support structure.

It is also necessary that any such rotor and stator construction efficiently transfers torque and other stresses from the field coils to the mounting for the field coil support structure. It will be readily appreciated that the rotor or stator must be capable of withstanding all the forces that it may be subject to during operation of the electrical machine. This includes short circuit torque, which is oscillatory and is typically many times greater than normal rated torque.

The rotor or stator must also be capable of being built at ambient temperature and subsequently having the field coils cooled down to the cryogenic temperatures at which they will operate. This cooling produces large contractive forces which the rotor or stator must withstand.

There is therefore a need for a rotor or stator for superconducting electrical machines that provides an adequate thermal barrier between the superconducting field coils and the mounting for the field coil support structure and that is also capable of withstanding the mechanical and thermal stresses that it will be subject to during construction and operation.

SUMMARY OF THE INVENTION

The present invention provides a rotor or stator for a superconducting electrical machine comprising a mounting maintained at substantially ambient temperature during operation of the electrical machine, a field coil support structure, a plurality of superconducting field coils maintained at cryogenic temperatures during operation of the electrical machine and supported by the field coil support structure, and at least one coupling element fixing the support structure to the mounting.

Preferably the field coils are high temperature superconducting (HTS) coils that are formed in a manner known to a person skilled in the art. However, it is also possible that the field coils are low temperature superconducting (LTS) coils.

The field coil support structure may be substantially a cylindrical sleeve that is formed around or within the mounting and has a first axial end and a second axial end.

If the rotor or stator of the present invention is substantially internal to and mounted within the other of the rotor or the stator of the same electrical machine then the field coils may be formed around, and are supported by, a radially outer cylindrical surface of the field coil support structure. Alternatively, if the rotor or stator of the present invention is external to and mounted around the other of the rotor or the stator of the same electrical machine then the field coils may be formed around, and are supported by, a radially inner cylindrical surface of the field coil support structure.

It will be readily appreciated that if the rotor or stator of the present invention is the radially inner member of an electrical machine then the mounting will be central within the electrical machine and may be a substantially cylindrical rod, shaft or tube sleeved inside the field coil support structure and fixed thereto. Such a central mounting may be solid but will preferably be substantially tubular in order to minimize its weight. The central mounting will also have a first axial end and a second axial end that are formed in the same orientation as the field coil support structure.

Alternatively, if a rotor or stator according to the present invention is the radially outer member of an electrical machine then the mounting will be external to the field coil support structure and may be a substantially cylindrical tube sleeved around the support structure and fixed thereto. In the case where the present invention is a stator then it will remain stationary in use and the mounting may have a substantially cylindrical inner surface but may be otherwise formed to any suitable shape.

In order to operate properly, the plurality of superconducting field coils must be cooled to suitable cryogenic temperatures. The field coil support structure will necessarily also be maintained at cryogenic temperatures during operation of the machine. However, the field coil support structure will be formed at substantially ambient temperatures and when the electrical machine is not operating both the field coils and the field coil support structure may be allowed to warm to substantially ambient temperatures. The mounting of the rotor or stator of the present invention will typically be maintained at a substantially ambient operating temperature in order to preserve its necessary physical properties such as strength and toughness and in order to enable it to be connected to other equipment that is at ambient temperature.

When cooled to cryogenic temperatures, the field coil support structure will contract in both the axial and radial directions. Since the mounting is not cooled and is maintained at a higher operating temperature, a contraction or expansion stress will be imposed on the, or each, coupling element depending upon whether the field coil support structure is internal or external to the mounting. It is necessary that the, or each, coupling element can withstand this stress and continue to function properly over an extended period. The contraction or expansion stress may be particularly acute in rotors or stators with a large diameter. Preferably, the stress is minimized through the design of the rotor or stator in general and the coupling elements in particular.

Preferably the, or each, coupling element is also designed to minimize the heat flow from the mounting to the field coil support structure during operation of the electrical machine. This is in order to minimize the amount of cooling required to maintain the field coil support structure and the field coils at cryogenic temperatures.

Minimizing the cooling required to maintain the field coil support structure and the field coils at cryogenic temperature is a crucial design factor for superconducting electrical machines. For example, using current technology, 100 Watts is required to remove 1 Joule of heat energy per second from a component maintained at 30K. Improvements to cooling systems are reducing this power requirement towards a theoretical minimum of 9 Watts. However, there will always be a real need to reduce any unnecessary heating of cryogenically cooled components. This heating may be internally generated, externally conducted or radiated into the cryogenic components.

Therefore, in order to minimize heat flow by conduction between the field coil support structure and the mounting the two components may be substantially separated over their respective axial lengths by a vacuum gap.

Furthermore, it is also preferable that any coupling elements used to fix the mounting to the field coil support structure minimize heat flow between the mounting and the support structure. Thus, the, or each, coupling element may be in contact with only a small portion of the surface of both the mounting and the field coil support structure. For example, it may be preferable that there are a plurality of coupling elements and that the mounting and field coil support structure are only fixed together at their respective first and second axial ends. The mounting and the support structure may then be separated from one another over the remainder of their axial length by a vacuum gap.

In order to further reduce the heat flow between the field coil support structure and the mounting, the, or each, coupling element of the present invention may be made of a suitable material with a relatively low thermal conductivity. The, or each, coupling element may be made of carbon fiber or glass fiber, for example.

Preferably the mounting and the field coil support structure will only be joined together at substantially their respective first and second axial ends. In order to enable this, the mounting and the field coil support structure may have at least one radially extending tab or flange formed at each of said ends where they are joined. The coupling elements may be fixed to any radially extending tab or flange formed on either the mounting or field coil support structure.

However, it is to be appreciated that coupling elements of rotors or stators according to the present invention may also be directly attached to the adjacent cylindrical surfaces of the mounting and field coil support structure. For example, coupling elements may be attached to an outer cylindrical surface of the radially innermost of the mounting and the field coil support structure at a first end and to an inner cylindrical surface of the radially outermost of the mounting and the field coil support structure at a second end. Furthermore, it is also possible that each coupling element is directly attached to a cylindrical surface of the mounting or field coil support structure at a first end but is attached to a radially extending tab or flange of the other of mounting or field coil support structure at a second end. Coupling elements fixed to the mounting and the field coil support structure in either of these manners may have substantial length (i.e., be substantially elongate) and may extend substantially circumferentially around the mounting and field coil support structure. Alternatively, the coupling elements may extend substantially radially from the mounting to the field coil support structure.

Any tab or flange formed on the radially innermost of the mounting and the field coil support structure may extend radially outwardly whilst any tab or flange formed on the radially outermost of the mounting and the field support structure may extend radially inwardly. The, or each, coupling element may then be fixed at a first end to a tab or flange of the mounting and at a second end to a tab or flange of the field coil support structure.

Preferably both the mounting and the field coil support structure will have continuous radially extending flanges formed around their respective first and second ends. Each flange of the radially innermost of the mounting and the field coil support structure may extend radially outwardly a distance less than the separation between the mounting and the field coil support structure. Likewise each flange of the radially outermost of the field coil support structure and the mounting may extend radially inwardly a distance less than the separation between the mounting and the field coil support structure. As an alternative, there may be a plurality of tabs formed on each of the mounting and the field coil support structure; the number of tabs on each being equal to the number of coupling elements that are used to fix the two components parts together. In this manner each coupling element may be joined to a separate tab around each of the mounting and the field coil support structure at each of their ends.

A plurality of coupling elements are preferably used to fix the mounting to the field coil support structure at both of their respective first and second axial ends. Each of the coupling elements may be a strut with a substantial length and may be fixed at a first end to a flange or tab of the mounting and at a second end to a flange or tab of the field coil support structure such that they extend in a substantially circumferential direction around the rotor or stator. The struts may be curved or substantially straight and are preferably rigid.

Alternatively, the coupling elements may extend substantially radially from the mounting to the field coil support structure. As a further alternative, any flanges or tabs of the field coil support structure and the mounting may be formed at relative axial positions such that each coupling element may be fixed at a first end to a tab or flange of the mounting and extend substantially parallel to an axis of the mounting and field coil support structure to a second end where they are fixed to a tab or flange of the field coil support structure.

Advantageously, the coupling elements may be slidably or pivotably fixed to the mounting and/or the field coil support structure to enable partial rotation and/or sliding movement to take place during relative thermal expansion or contraction of the mounting and the field coil support structure. This may enable the coupling elements to accommodate the radial and axial thermal expansion and contraction of the field coil support structure without becoming overly stressed.

If the coupling elements have a substantial length and extend substantially circumferentially around the rotor or stator they will be better able to withstand any thermal contraction stress they are subjected to during operation of the electrical machine. Generally, the longer the coupling elements are the greater their resistance to contraction stress will be. This is because the degree of bending of the circumferential coupling elements as a result of thermal contraction of the field coil support structure is reduced as the length of the coupling elements is increased.

The length of the coupling elements may also help to reduce the heat flow between the mounting and the field coil support structure. The greater the length of the coupling elements, the lower the heat flow between the mounting and the field coil support structure will be. Similarly, if the aggregate cross-sectional area perpendicular to the direction of the heat flow of the coupling elements is reduced then the heat flow will also be reduced. It is therefore preferable that the length of coupling elements in rotors or stators according to the present invention is maximized and the aggregate cross-sectional area of the coupling elements is minimized. However, it is important that the coupling elements are strong enough to effectively transfer torque between the mounting and the field coil support structure during operation of the electrical machine. The coupling elements must also be able to withstand all the other stresses to which they will be subjected for example, short circuit torque which may be high and oscillatory.

As will be appreciated by the person skilled in the art, the number of coupling elements present in any rotor or stator according to the present invention will depend on the size, design and intended use of the specific rotor or stator. The design and number of coupling elements will be dependent upon the stresses the coupling elements will be subject to and the heat flow between the mounting and the field coil support structure.

Preferably, the coupling elements will be substantially linear struts formed of carbon fiber or glass fiber. Carbon fiber or glass fiber is particularly suitable as it has a relatively low thermal conductivity, is lightweight and may be formed to be particularly strong in one or possibly two directions. If linear struts are formed of carbon fiber it may be preferable that they are formed such that they are strongest along the axial direction of the struts (i.e., that the primary direction of fiber lay is substantially along the axis of the struts). Alternatively, it may be preferable that the linear struts are formed such that the primary direction of fiber lay minimizes their thermal expansion and contraction during use of the electrical machine.

Forming the coupling elements as linear struts is particularly preferred as struts may transmit both positive and negative torque from the field coil support structure to the mounting. They may also provide a long, low thermal conductivity path between the mounting and the field coil support structure. They may also minimize the radial and axial stress due to the cooling of the field coil support structure if they are mounted substantially circumferentially around the rotor or stator and have sufficient length to minimize deflection stresses.

When under tensile stress, coupling elements formed as linear struts will act in substantially the same manner as tie rods. When under compressive stress, the coupling elements will act as bracing struts. To improve the capability of the coupling elements to act as bracing struts and withstand compressive forces they may be pre-tensioned. As will be understood by those skilled in the art, pre-tensioning may be applied to the coupling elements either during assembly of the rotor at ambient temperatures, or during cooling of the field coil support structure to cryogenic temperatures.

In a preferred arrangement, each rotor or stator may have eight substantially linear struts to fix the mounting and the field coil support structure together at each of their respective first and second axial ends. The mounting and the field coil support structure may then be separated by a vacuum gap.

Further features and advantages of the present invention will become apparent from the specific embodiment of the present invention that is discussed with reference to the following drawings.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
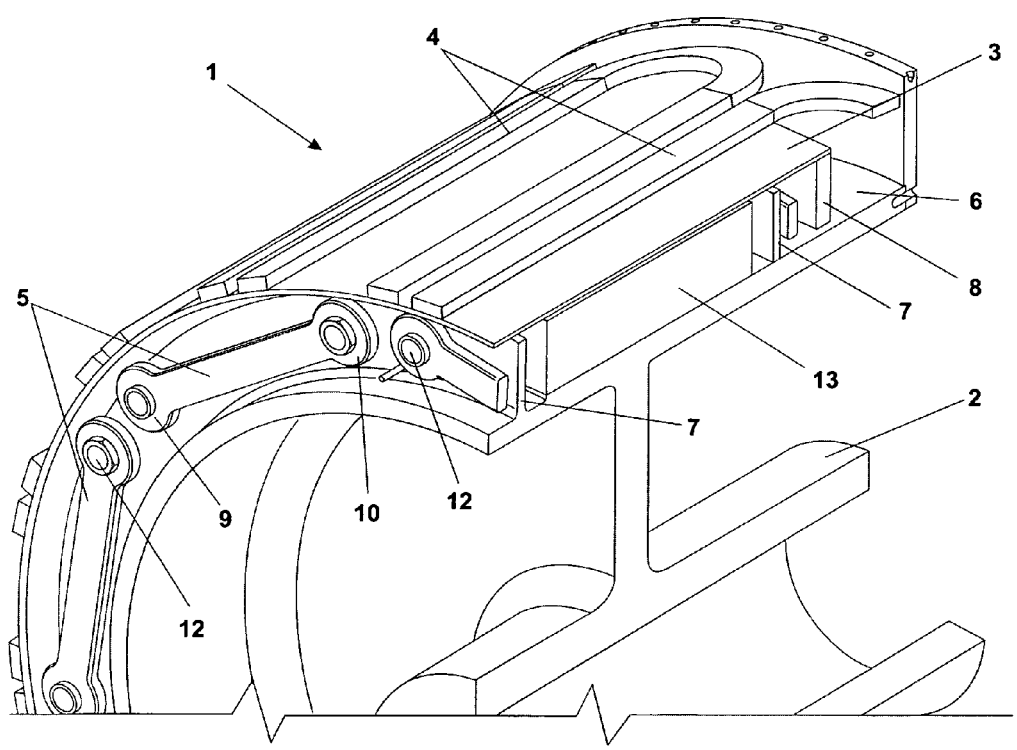
FIG. 1 shows a cutaway view of a rotor according to the present invention.

A cutaway view of a rotor 1 according to the present invention is shown in FIG. 1. The rotor 1 substantially consists of a mounting 2, a field coil support structure 3, a plurality of field coils 4 and a plurality of coupling elements 5. The rotor 1 may form part of an electrical machine (not shown) in a manner that will apparent to a person skilled in the art.

The mounting 2 is substantially hollow and tubular and has a cylindrical outer surface 6. The mounting 2 forms the central shaft of the electrical machine 1. During operation of the electrical machine, the mounting 2 will be maintained at a substantially ambient operating temperature in order to maintain its necessary physical properties such as strength and torque resistance.

A pair of circumferentially continuous radially outward extending flanges 7 is formed on the outer cylindrical surface 6 of the mounting 2. Each flange 7 extends radially outward from the mounting 2 a distance that is less than the radial separation between the outer surface 6 of the mounting 2 and a radially inner surface of the field coil support structure 3. This can be seen most clearly in FIG. 2.

The field coil support structure 3 is substantially cylindrical and is sleeved around the mounting 2 so as to be at a constant radial separation from the outer surface 6 of the mounting 2 about its circumference. The plurality of field coils 4 are formed around, and supported by, the radially outer surface of the field coil support structure 3. The field coils 4 are high temperature superconducting field coils and may be formed from any suitable high temperature superconducting material and in any manner apparent to a person skilled in the art.

The field coil support structure 3 and field coils 4 are constructed and fixed to the mounting 2 whilst the rotor is at substantially ambient temperature. However, during operation of the electrical machine, the field coils 4 and the field coil support structure 3 are maintained at a suitable cryogenic temperature by a cooling system (not shown) in a manner that will be immediately apparent to a person skilled in the art. When the rotor 1 is idle, the field coils 4 and the field coil support structure 3 may be allowed to warm up. During warming from, and cooling to, cryogenic temperatures the field coils 4 and the field coil support structure 3 will undergo significant thermal expansion and contraction. This places a radial and axial stress upon the coupling elements 5.

The field coil support structure 3 has a pair of circumferentially continuous radially inward extending flanges 8 formed on its radially inner surface. Each flange 8 extends radially inwardly from the field coil support structure 3 a distance that is less than the radial separation between the outer surface 6 of the mounting 2 and the radially inner surface of the field coil support structure 3. Once again, this can be seen most clearly in FIG. 2.

Figure 4:
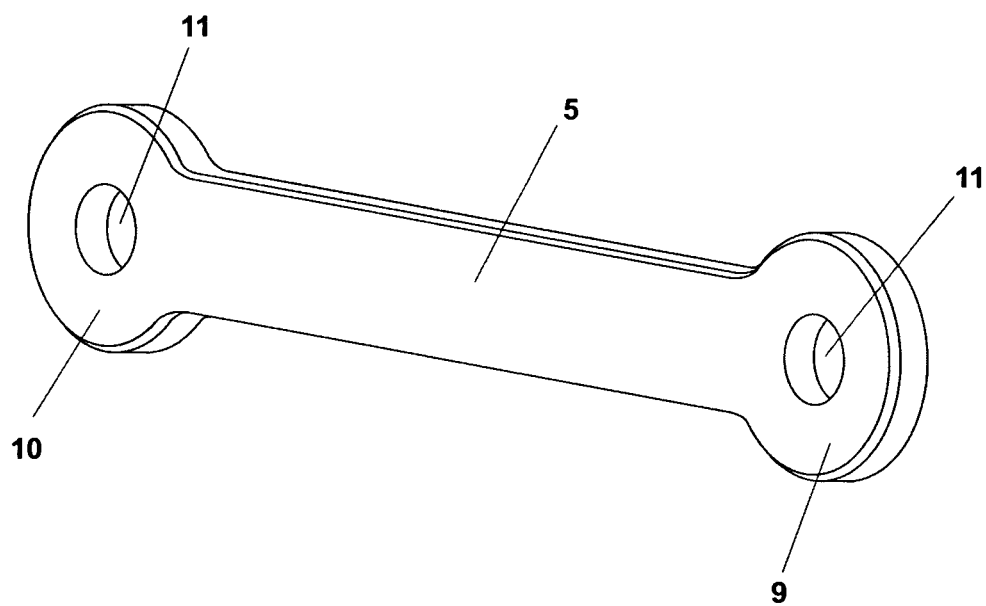
FIG. 4 shows a single coupling element as used in the rotor of FIGS. 1 to 3.

Each of the plurality of coupling elements 5 is substantially identical. An individual coupling element is shown in FIG. 4. Each coupling element 5 is formed as a substantially linear strut and has a first end 9 and a second end 10. At both the first end 9 and the second end 10 there is a hole or opening 11 to enable the coupling elements 5 to be attached to the flange 8 of the field coil support structure 3 or the flange 7 of the mounting 2. The coupling elements 5 are formed of carbon fiber such that the primary direction of fiber lay extends along the axis of the coupling elements from the first end 9 to the second end 10. In this manner the coupling elements 5 are each strongest along their axis and may withstand the forces that they are subject to during operation of the electrical machine.

Figure 2:
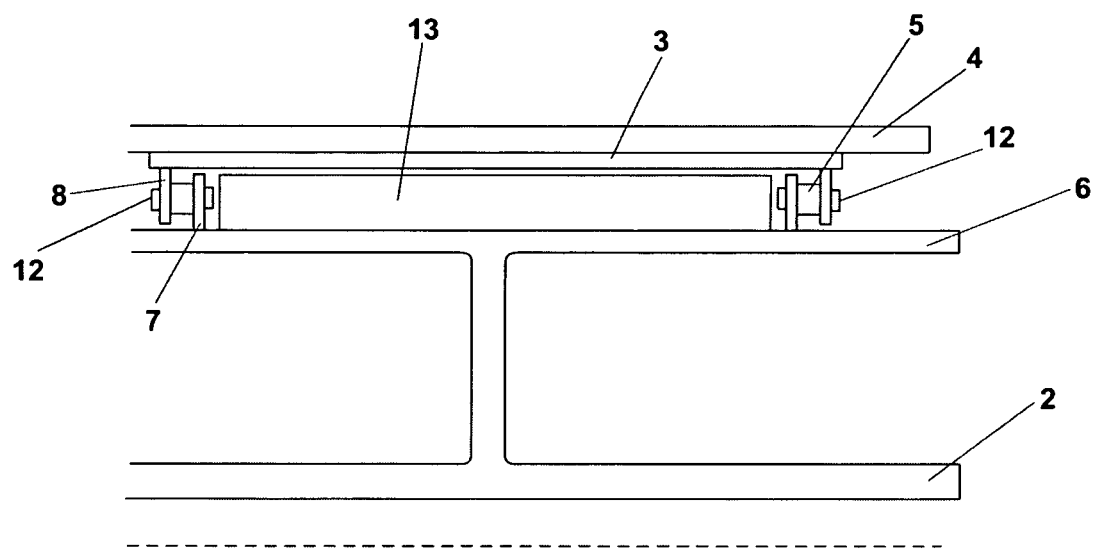
FIG. 2 shows a partial cross-section of the rotor of FIG. 1.
Figure 3:
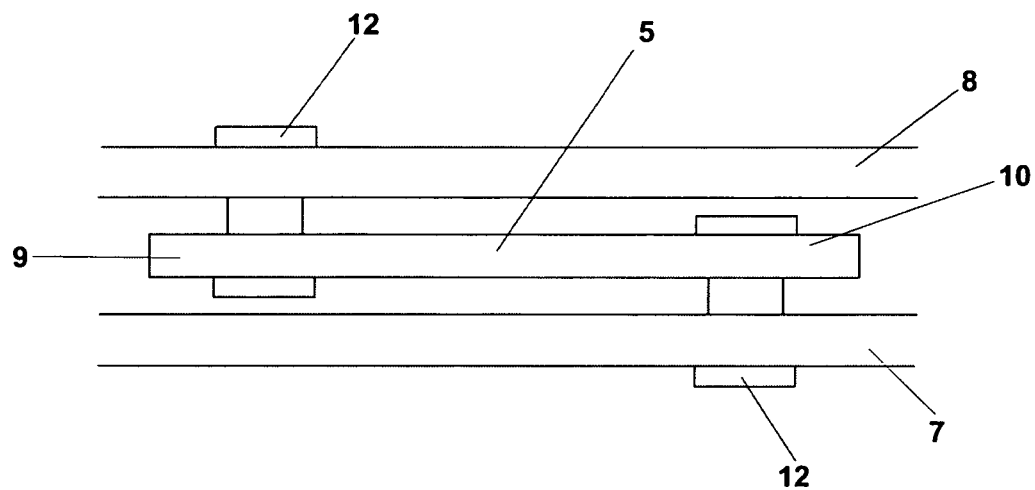
FIG. 3 shows a plan view of a coupling element connecting a flange of a mounting and a flange of a field coil of the rotor of FIGS. 1 and 2.

As can be seen most clearly in FIGS. 2 and 3, the flanges 7, 8 and the coupling elements 5 serve to fix the field coil support structure 3 to the mounting 2. The first end of each coupling element 5 is pivotably connected to the flange 8 of the field coil support structure 3 by a bolt 12. Similarly, the second end of each coupling element 5 is pivotably connected to the cooperating flange 7 of the mounting 2 by a bolt 12. The coupling elements 5 extend substantially circumferentially around the rotor 1 and may rotate slightly relative to the rest of the rotor 1 during thermal expansion and contraction of the field coil support structure 3. In this embodiment of the invention, eight coupling elements 5 are fixed around each pair of cooperating flanges 7, 8.

The coupling elements 5 may be axially spaced apart from the cooperating flanges 7, 8 as shown in FIG. 3.

A cylindrical iron core 13 is provided between the mounting 2 and the field coil support structure 3. During operation of the rotor 1, the iron core 13 is maintained at ambient temperature. The iron core 13 is attached to the radially outer surface of the mounting 2 and is separated from the field coil support structure 3 by a vacuum gap.

The construction of the rotor 1 shown in FIGS. 1 to 4 provides a number of advantages over the prior art. First of all, the mounting 2 and the field coil support structure 3 are only fixed together by the coupling elements 5 at their cooperating flanges 7, 8. This minimize the total cross-sectional area of the thermal pathway between the two components. Each individual coupling element 5 has a relatively small cross-sectional area between its first end 9 and second end 10 in order to further reduce this thermal pathway. Furthermore, the coupling elements 5 have a substantial length and are made of carbon fiber, which has a relatively low thermal conductivity. These factors also further serve to minimize heat flow between the field coil support structure 3 and the mounting 2.

The coupling elements 5 provide adequate compressive capability together with axial and radial stiffness. This eliminates the need for any additional axial or radial supports.

The coupling elements 5 and flanges 7, 8 also serve to effectively transfer the torque between the field coil support structure 3 and the mounting 2 and may withstand all of the forces that they may be subjected to during operation of the rotor 1. In particular, they may withstand both tensile and compressive forces, such as the strong oscillatory forces produced by short circuit torque. When under tensile stress, the coupling elements 5 will act as tie rods, whilst under compressive stress the coupling elements will act as bracing struts. To improve their capability to act as bracing struts and withstand compressive forces, the coupling elements 5 are pre-tensioned. Pre-tensioning is applied during assembly of the rotor at ambient temperatures.

The length of the coupling elements 5 and their mounting in a substantially circumferential direction around the rotor 1 minimizes the axial and radial stresses they are subjected to as a result of the thermal expansion and contraction of the field coil support structure 3.

Figure 5:
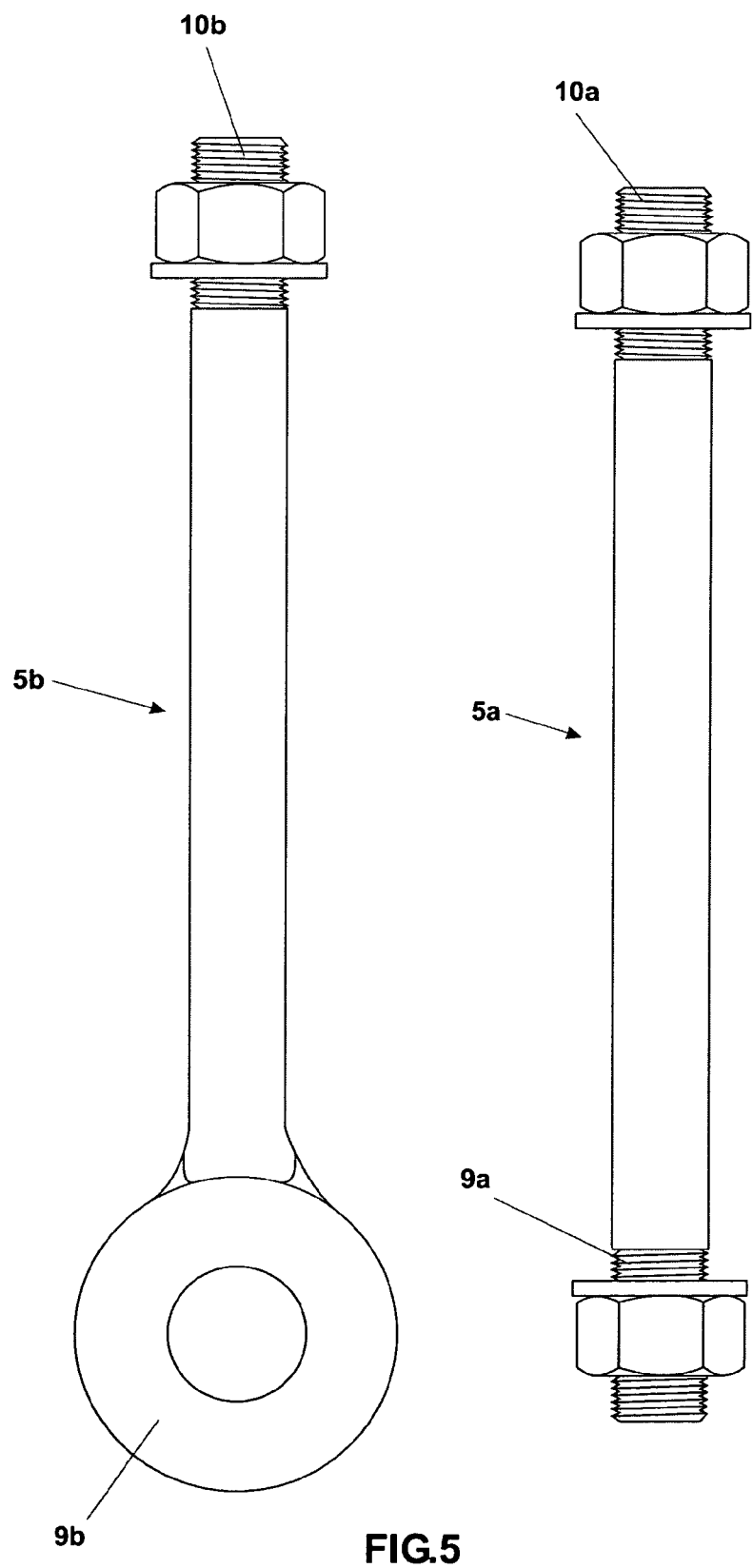
FIG. 5 shows two alternative coupling elements.

Two alternative coupling elements 5a, 5b are shown in FIG. 5. Coupling element 5a is suitable for use as a radial strut to be bolted directly through a cylindrical surface of the mounting at a first end 9a and through a cylindrical surface of the field coil support structure at a second end 10a. Alternatively, the coupling element 5a may be used as a substantially axially extending strut. It may be fixed at a first end 9a to a flange or tab of the mounting and at a second end 10a to a flange or tab of the field coil support structure such that it extends in a direction substantially parallel to the axis of the field coil support structure and the mounting.

Coupling element 5b has a first end 9b that is the same as the first or second end 9, 10 of the coupling element 5 of FIG. 4 and can thus be fixed to either the field coil support structure or the mounting in the manner described above for coupling element 5. The coupling element 5b has a second end 10b that is the same as the first or second end 9a, 10a of the coupling element 5a and can thus be fixed to either the field coil support structure or the mounting in the manner described above for coupling element 5a.

What is claimed is:

1. A rotor or stator for a superconducting electrical machine, comprising:
    a mounting maintained at substantially ambient temperature during operation of the electrical machine;
    a field coil support structure;
    a plurality of superconducting field coils maintained at cryogenic temperatures during operation of the electrical machine and supported by the field coil support structure; and
    a plurality of coupling elements, each coupling element being a substantially elongate linear strut having a longitudinal axis that is substantially aligned with a tangent of the rotor or stator, each coupling element having a first end that is pivotally connected to one of the mounting and the field coil support structure, and a second end that is connected to the other of the mounting and the field coil support structure.

2. A rotor or stator according to claim 1, wherein the field coils are high temperature superconducting coils.

3. A rotor or stator according to claim 1, wherein the field coil support structure is substantially a cylindrical sleeve formed around the mounting and has a first axial end and a second axial end.

4. A rotor or stator according to claim 3, wherein the field coils are formed around, and are supported by, an outer cylindrical surface of the field coil support structure.

5. A rotor or stator according to claim 3, wherein the mounting is substantially tubular.

6. A rotor or stator according to claim 3, wherein the mounting has a first axial end and a second axial end formed in the same orientation as the first and second axial ends of the field coil support structure; and further comprising a plurality of coupling elements fixing the mounting and the field coil support structure together at their respective first and second axial ends.

7. A rotor or stator according to claim 6, wherein the mounting and the field coil support structure are separated from one another over their axial length between their respective first and second axial ends by a vacuum gap.

8. A rotor or stator according to claim 6, wherein the radially innermost of the mounting and the field coil support structure has at least one radially outwardly extending tab or flange formed at its first axial end and its second axial end, the radially outermost of the mounting and the field coil support structure has at least one radially inwardly extending tab or flange formed at its first axial end and its second axial end, and each coupling element is attached at a first end to a tab or flange of the mounting and at a second end to a cooperating tab or flange of the field coil support structure.

9. A rotor or stator according to claim 8, wherein both the mounting and the field coil support structure have continuous radial flanges formed at each of their respective first and second axial ends.

10. A rotor or stator according to claim 9, wherein the radial flanges of the radially innermost of the mounting and the field coil support structure extend radially outwardly a distance that is less than the radial separation between the mounting and the field coil support structure.

11. A rotor or stator according to claim 9, wherein the flanges of the radially outermost of the mounting and the field coil support structure extend radially inwardly a distance that is less than the radial separation between the field coil support structure and the mounting.

12. A rotor or stator according to claim 8, wherein both the mounting and the field coil support structure have a plurality of circumferentially spaced tabs formed at each of their respective first and second axial ends, the number of tabs on each of the mounting and the field coil support structure being equal to the number of coupling elements fixing the mounting to the field coil support structure, such that each individual coupling element is attached at a first end to respective tab of the mounting and at a second end to a respective tab of the field coil support structure.

13. A rotor or stator according to claim 8, wherein the coupling elements extend substantially circumferentially around the rotor or stator.

14. A rotor or stator according to claim 8, wherein the coupling elements extend substantially radially from the mounting to the field coil support structure.

15. A rotor or stator according to claim 8, wherein the coupling elements extend in a direction substantially parallel to a longitudinal axis of at least one of the mounting and the field coil support structure.

16. A rotor or stator according to claim 1, wherein the field coil support structure is substantially a cylindrical sleeve formed within the mounting and has a first axial end and a second axial end.

17. A rotor or stator according to claim 16, wherein the field coils are formed around, and are supported by, an inner cylindrical surface of the field coil support structure.

18. A rotor or stator according to claim 1, wherein each coupling element is formed of a high strength low thermal conductivity material.

19. A rotor or stator according to claim 1, wherein the second end of the linear strut is pivotally connected to the other of the mounting and the field coil support structure.

20. A rotor or stator for a superconducting electrical machine, comprising:
 a mounting maintained at substantially ambient temperature during operation of the electrical machine;
 a field coil support structure;
 a plurality of superconducting field coils maintained at cryogenic temperatures during operation of the electrical machine and supported by the field coil support structure; and
 at least one coupling element fixing the support structure to the mounting, the at least one coupling element being formed substantially of carbon fiber or glass fiber, and the primary direction of fiber lay being substantially parallel to an axis of the at least one coupling element.

21. A rotor or stator for a superconducting electrical machine, comprising:
 a mounting maintained at substantially ambient temperature during operation of the electrical machine;
 a field coil support structure;
 a plurality of superconducting field coils maintained at cryogenic temperatures during operation of the electrical machine and supported by the field coil support structure; and
 at least one coupling element fixing the support structure to the mounting, the at least one coupling element being formed substantially of carbon fiber or glass fiber, and the primary direction of fiber lay being at an angle that minimizes thermal contraction of the at least one coupling element when the field coils are cooled to cryogenic temperatures.

22. A rotor or stator for a superconducting electrical machine, comprising:
 a mounting maintained at substantially ambient temperature during operation of the electrical machine;
 a field coil support structure;
 a plurality of superconducting field coils maintained at cryogenic temperatures during operation of the electrical machine and supported by the field coil support structure; and
 at least one coupling element fixing the support structure to the mounting. the at least one coupling element being pre-tensioned during assembly of the rotor or stator to improve the ability of the at least one coupling element to act as a bracing strut and withstand compressive forces.

23. A rotor or stator for a superconducting electrical machine, comprising:
 a mounting maintained at substantially ambient temperature during operation of the electrical machine, the mounting having a first axial end and a second axial end;
 a field coil support structure having a first axial end and a second axial end;
 a plurality of superconducting field coils maintained at cryogenic temperatures during operation of the electrical machine and supported by the field coil support structure; and
 at least one coupling element fixing the support structure to the mounting, the at least one coupling element having a first end and a second end,
 wherein the radially innermost of the mounting and the field coil support structure has at least one radially outwardly extending tab or flange formed at its first axial end and its second axial end,
 wherein the radially outermost of the mounting and the field coil support structure has at least one radially inwardly extending tab or flange formed at its first axial end and its second axial end, and
 wherein the at least one coupling element is attached at the first end to a tab or flange of the mounting and at the second end to a cooperating tab or flange of the field coil support structure.

* * * * *